Patented July 7, 1925.

UNITED STATES PATENT OFFICE.

JOHN C. HEBDEN, OF NEW YORK, N. Y., ASSIGNOR TO HEBDEN SUGAR PROCESS CORPORATION, OF NEW YORK, N. Y., A CORPORATION OF NEW YORK.

METHOD OF RECOVERING AND ACTIVATING NITROGENOUS SUBSTANCES.

No Drawing.    Application filed October 28, 1922. Serial No. 597,682.

*To all whom it may concern:*

Be it known that I, JOHN C. HEBDEN, a citizen of the United States, residing at New York, in the county of New York and State of New York, have invented certain new and useful Improvements in Methods of Recovering and Activating Nitrogenous Substances, of which the following is a specification.

The present invention relates to the purification of raw cane sugar juices and the primary object of the invention is to provide a method of recovering, purifying and activating the protein or albuminous bodies present in raw cane sugar juices, thus removing these protein or similar bodies from the sugar product, and hence enabling a sugar of higher purity to be obtained and also effecting economies in the sugar purification process by converting an otherwise waste product into a purifying re-agent and enabling the nitrogen fixed in these bodies to be recovered for use as a fertilizer or for other purposes.

In my prior application Serial No. 466,493, filed May 3, 1921, I have described a method of purifying cane sugar products and especially cane sugar juices, by treating the same with an activated substance or mordant or with a substrate carrying such activated substance or mordant, whereby the activated substance or mordant, or the substrate containing such activated substance or mordant takes up or removes the impurities from the sugar juice. These impurities in the raw juices consist, as explained in my prior application referred to, of colors or dyestuffs, either mordant dyeing or basic, or both, vegetable gums and similar compounds, nitrogenous, albuminous or protein substances, and tannins, polyphenols and weak acids.

The activated substance or mordant used either with or without a substrate to take up or remove the impurities from the sugar juice, may consist of any of the re-agents described in said prior application. It preferably comprises an insoluble basic compound which may consist of any of the insoluble hydroxides or tannates of metals, preferably the hydroxides or tannates of iron, alumina or titanium, the insoluble ferrocyanides, the insoluble ferri cyanides, or the insoluble sulfocyanides; or the activated substance or mordant may consist of a synthetic animal fibre or a synthetic substance having the same affinity or capacity for absorbing basic dyestuffs, as does wool, leather, protein and similar substances, such for example, as an insoluble compound or precipitate of a gelatine or similar nitrogenous substance which can be rendered insoluble and thus precipitated by various inorganic compounds, such as salts of chromium, iron, or alumina, or by organic compounds, as for example, tannic acid or those bodies which are classed under the generic or comprehensive term tannin or formaldehyde or similar substances, as well as the synthetic or manufactured products which can be used for tanning hides to produce leather, as for example, sulfonic acids of the aromatic hydrocarbons or other substituted compounds, or the condensation products derived from these, either with or without the use of formaldehyde or similar condensing agents. Also the products derived from the sulfite waste liquors of the sulfite wood pulp manufacture industry, commercially known as "lignone", sulfite waste and similar denominations may be used as precipitating re-agents to produce the insoluble glue, gelatine or protein compounds. Any one or more of these re-agents can be prepared substantially as described in said prior application to produce an insoluble activated substance or mordant, either by itself or on a substrate.

The substrate itself when used, may consist of any of those referred to in my above identified application. For example, it may comprise an insoluble base, such for instance, as fuller's earth, kaolin or china clay, ground silica, dry alumina hydrate of the kind insoluble in water, kieselguhr or infusorial earth, ground wood or wood flour, or any other finely-divided substance which is insoluble in water and upon which the activated substance or mordant can be precipitated. It is particularly advantageous, however, to employ bagasse in a finely divided condition, owing to its porous or spongy nature and the fact that it can be readily prepared for use and can be readily removed from the cane juice, as is set forth in my prior application Serial No. 512,075, filed November 1, 1921.

The activated substrates, when used, may be prepared substantially as described in my prior application Serial No. 466,493. For example, in preparing a substrate carrying an insoluble tannate as an activated substance, or mordant, the procedure may be substantially as follows:

To a suspension of bagasse, infusorial earth or any other suitable insoluble finely divided substance is added the salt of a metal, the insoluble tannate of which is to be produced. Where, for instance, the insoluble tannate of alumina is to be produced, there is added to the suspension sufficient sulfate of alumina to precipitate in and on the substrate, say one-fourth of one per cent of the weight of the sugar to be treated, of alumina hydroxide. The precipitation is performed preferably hot by sodium carbonate or any alkali which will transpose alumina sulfate and precipitate the hydroxide, leaving a soluble sulfate. A solution of tannic acid or any suitable tannin is then added to the substrate upon which the hydroxide is precipitated, the amount of tannic acid or tannin added being sufficient to combine with all or a part of the hydroxide. The insoluble tannate thus prepared is then washed with hot water to remove all products soluble therein, then filter-pressed and is then ready for use. The procedure for the preparation of other insoluble tannates, such as the tannates of iron and titanium would be the same as that for the tannate of alumina except that a ferric salt or a titanium salt would be used instead of an alumina salt, and ferric or titanium hydroxide would be produced instead of alumina hydroxide. Some insoluble tannates can be produced by adding to the substrate the salt of the metal whose tannate is required and adding to this mixture the tannic acid or tannin, thus precipitating the insoluble tannate.

In preparing a substrate containing an activated substance or mordant above designated as synthetic animal fibre, the procedure may be substantially as follows:

To a suspension of bagasse, infusorial earth or any finely divided substance insoluble in water, there is added one-fourth of one per cent of the amount of sugar to be treated, of a good quality of glue or other protein or nitrogenous substance. To this mixture, while of a temperature at or near the boiling point of water, there is added sufficient tannic acid, tannin or any of the substances enumerated in the foregoing description of the so-called synthetic animal fibre, to coagulate or precipitate the gelatine or glue substance. The compound thus formed can then be washed with water until all the material soluble therein is removed or it can be treated with the salt of a metal, as for instance, aluminum sulfate in order to harden the compound formed as above described; or the compound may be treated with the salt of a metal, as for instance, aluminum sulfate in excess, in order to harden the product as described, and the excess of the compound thus used for hardening can be precipitated as hydroxide. The above described hardened compound plus the hydroxide may also be treated with tannin or any of the other substances hereinbefore enumerated in the description of the synthetic animal fibre.

The purification of cane sugar juices with an activated substance or mordant or a substrate carrying such activated substance or mordant may be carried out substantially as described in my above-mentioned applications Serial Nos. 466,493 and 512,074. For example, one of the activated substances or mordants, either with or without the substrate, or a combination of two or more of these, as hereinbefore described, is added to the raw cane sugar juice, the latter is thoroughly stirred to cause the compound to mix therewith and the mixture is allowed to react for about one-half hour at a temperature preferably of from 200° to 220° F. A longer treatment can be given, as required, but in order to prevent inversion, due to the action of heat upon the juice, it is desirable to treat the latter for a time just sufficient to take up or fix the coloring matters or to take up and remove the gums or waxes and protein substances.

In raw cane sugar juices, the percentage of nitrogenous bodies varies within fairly wide limits, but a fair estimate of the percentage of nitrogenous bodies in raw cane sugar juices as obtained from the present mill practice would be about one-half of one per cent, of which one-third to one-half may be classed as true albuminoids. These bodies are coagulated during the heating of the juice and contribute in the regular practice when lime is used as a defacating agent, to the formation of a percentage of precipitate and aid in the clarifying of the juice. In the method described above for purifying the raw cane sugar juices, however, these nitrogenous or albuminoid substances enter into direct combination or are absorbed by the dye mordant or the activated substance and are at the same time coagulated by the action of the heat, so that there is coming from the raw juice a product which can be used for the building up of a purifying re-agent similar to or equivalent to the synthetic fibre or gelatine-tannin compound as described above. In order to take advantage of this discovery, all that is necessary is to treat the precipitate formed by the method described for the use of the dye mordant or the activated substance in purifying raw sugar juices, which precipitate carries the combined dye stuffs and absorbed impurities, viz:—gums, polyphenols and precipitated albuminous substances, with the salt of a metal, as for i stance, sulfate of alumina, ferric sulfate or titanium sulfate in a boiling solution, whereby the coagulated and precipitated nitrogenous substances are hardened just as any other albuminous or gelatine-like substance would be hardened by treatment with similar salts of metals and the absorbed and hydrolizable impurities are rendered soluble. The amount of the impurities will vary and hence the amount of salt to be used will vary so that no definition of the amount of salt to be used can be given, this being determined in each case by trial. If the amount of salt used is insufficient, some of the impurities will be left unhydrolyzed, and if it is in excess of that required to hydrolize the impurities, some of the activated substance will be decomposed. The excess of the salt of the metal used can be then neutralized with any alkali which will precipitate a hydroxide and there is present in the re-generated dye mordant or substrate an insoluble hydroxide of a metal and a nitrogenous or albumin-like compound, both of which will combine with tannic acid and yield a quantity of active material for purifying the raw juice when the same is treated with the recovered and re-generated material obtained after this method.

The advantage in utilizing the albuminous or nitrogenous substances contained in the juice by following this procedure are, that not only is a waste product, the nitrogenous or albuminous substance, converted into a valuable purifying material, but in addition the nitrogen fixed in these compounds can be recovered and be available as fertilizer and will thus increase the economies of the general process. As the quantity of recovered substrate or activated substance or dye mordant plus the increment of insoluble nitrogenous or albuminous substance accumulates, the excess not required for treating the regular run of juice is discarded and is thus available as fertilizer.

The term albuminous or nitrogenous substances has been used above, following the practice in the literature describing the products from raw juices from sugar cane, but all of these bodies could probably be better described as protein substances.

I claim as my invention:—

1. The herein described process of recovering, purifying and activating the nitrogenous substances contained in cane sugar juices which comprises precipitating the nitrogenous substances from the cane juice, treating such precipitated nitrogenous substance with a salt of a metal which when decomposed with an alkali will form an insoluble hydroxide of a metal, mixed with the nitrogenous substance present, and combining tannic acid with said hydroxide of a metal and the nitrogenous substance.

2. The herein described process of recovering, purifying and activating the nitrogenous substances contained in cane sugar juices which comprise precipitating impurities from cane sugar juice, treating the precipitated impurities with a hydroxide of a metal which will form a tannate insoluble in water, thereby coagulating the nitrogenous substances, and treating the recovered nitrogenous substance with a tannin compound.

3. The herein described process of recovering, purifying and activating the nitrogenous substances contained in cane sugar juices which comprises precipitating impurities from cane sugar juice, treating the precipitated impurities with a hydroxide of a metal which will form a tannate insoluble in water, thereby coagulating the nitrogenous substances and hydrolyzing the remaining impurities, removing the hydrolyzed impurities, and treating the remaining nitrogenous substance with a tannin compound.

4. The herein described process of recovering, purifying and activating the nitrogenous substances contained in cane sugar juices which comprises precipitating the impurities from cane sugar juice, treating the precipitated impurities with a hydrolyzing reagent which will hydrolyze and render soluble some of said impurities and will coagulate the nitrogenous substance and which when decomposed with an alkali will leave therein a hydroxide of a metal insoluble in water, and treating the nitrogenous substance and the insoluble hydroxide of a metal with a tannin.

5. The herein described process of recovering, purifying and activating the nitrogenous substances contained in cane sugar juices which comprises precipitating the impurities from cane sugar juice, treating the precipitated impurities with a hydrolyzing reagent which will hydrolyze and render soluble some of said impurities and will coagulate the nitrogenous substance and which when decomposed with an alkali will leave therein an insoluble hydroxide of a metal, removing the soluble impurities, and treating the nitrogenous substance and the insoluble hydroxide of a metal with a tannin.

6. The hereindescribed process of recovering, purifying and activating the nitrogenous substances contained in cane sugar juices which comprises precipitating the impurities from such a juice, treating such precipitated impurities with a hydrolyzing reagent which will hydrolyze and render soluble some of said impurities and will coagulate the nitrogenous substances and which when decomposed with an alkali will leave therein an insoluble hydroxide of a metal, and washing out the soluble impurities.

7. The herein described process of recovering, purifying and activating the nitrogenous substances contained in cane sugar juices which comprises treating such juice with a dye mordant to precipitate the impurities in such juice, removing the precipitate from the juice, treating the precipitate thus recovered with a salt of a metal which will render soluble in water part of said impurities and harden the nitrogenous substances and which when decomposed with an alkali will leave therein a hydroxide of a metal insoluble in water, removing the soluble impurities, and treating the nitrogenous substances and the hydroxide with a tannin.

In testimony whereof I have hereunto set my hand.

JOHN C. HEBDEN.